United States Patent
Le-Ngoc (10) Patent No.: US 6,714,551 B1
(45) Date of Patent: Mar. 30, 2004

(54) METHOD AND APPARATUS FOR MAINTAINING A PREDEFINED TRANSMISSION QUALITY IN A WIRELESS NETWORK FOR A METROPOLITAN AREA

(75) Inventor: Tho Le-Ngoc, Anjou (CA)

(73) Assignee: Alvarion Israel (2003) Ltd., Tel Aviv (IL)

( * ) Notice: Subject to any disclaimer, the term of this patent is extended or adjusted under 35 U.S.C. 154(b) by 596 days.

(21) Appl. No.: 09/620,301

(22) Filed: Jul. 19, 2000

Related U.S. Application Data (62) Division of application No. 08/950,028, filed on Oct. 14, 1997, now abandoned.

(51) Int. Cl.[7] .......................... H04L 12/26; H04L 12/28
(52) U.S. Cl. ...................... 370/401; 370/252; 370/477; 375/130
(58) Field of Search ............................... 370/252, 278, 370/329, 338, 391, 401, 477, 352, 318, 315, 248; 375/130, 136, 147, 211, 219; 455/427, 13.4; 709/224, 241

(56) References Cited

U.S. PATENT DOCUMENTS 3,564,144 A    2/1971   Diggelmann ................ 179/15

(List continued on next page.)

FOREIGN PATENT DOCUMENTS

| GB | 2306278 A | * 10/1995 | |
|---|---|---|---|
| GB | 2306278 A | 4/1997 | ............. H04L/1/00 |
| GB | 2316583 A | 2/1998 | ............. H04L/29/06 |
| WO | WO 94/27382 | 11/1994 | ........... H04B/7/216 |
| WO | WO 98/10541 A1 | 3/1998 | ............. H04J/3/16 |

OTHER PUBLICATIONS

"Design of A Selective FEC Subsystem to Counteract Rain Fading in Ku–Band TDMA Systems," G. McMillen, B. Mazur and T. Abdel–Nabi, International Journal of Satellite Communications, vol. 4, pp. 75–82, 1986.

(List continued on next page.)

*Primary Examiner*—Chi Pham
*Assistant Examiner*—Afsar M. Qureshi
(74) *Attorney, Agent, or Firm*—Browdy and Neimark, P.L.L.C.

(57) ABSTRACT

A technique for maintaining a predefined transmission quality in a wireless Metropolitan Area Network (MAN). Each of a plurality of Local Area Networks are coupled to a corresponding router. Each router is coupled to one or more transceivers for interconnecting the routers via wireless links. Each router stores a table representative of the topology of the MAN and receives detected indicia representative of the quality of the wireless links and representative of network traffic loads. The router adapts the manner of transmission and the path of transmission according to the indicia. As a result, the MAN is highly efficient, in terms of cost, power and bandwidth utilization. For example, a strength of a signal received over a wireless communication link is periodically monitored for maintaining the strength within a predefined range by adjusting the transmission power. In addition, an error rate for the data received over the link is monitored. If the received signal strength remains below the predefined range despite the transmit power having been adjusted to a maximum allowable level, and if the error rate approaches a predefined limit, one or more techniques are selectively employed to reduce the error rate while maintaining a sufficiently high network throughput. The adaptive techniques include changing the data rate, modulation level, error correction coding, and spectrum spreading. In addition, a path for the data is preferably selected according to an Open-Shortest-Path-First algorithm, though one or more alternate paths can be selected for transmitting at least a portion of the data.

6 Claims, 6 Drawing Sheets

U.S. PATENT DOCUMENTS

| | | | |
|---|---|---|---|
| 3,988,545 A | | 10/1976 | Kuemmerle et al. ..... 179/15 BV |
| 4,731,785 A | | 3/1988 | Ferenc et al. .................. 370/60 |
| 4,876,742 A | | 10/1989 | Vacon et al. ................... 455/66 |
| 4,893,340 A | | 1/1990 | Lubarsky et al. ............. 380/50 |
| 4,975,906 A | | 12/1990 | Takiyasu et al. ......... 370/85.13 |
| 5,050,166 A | | 9/1991 | Cantoni et al. ............. 370/94.1 |
| 5,119,226 A | | 6/1992 | Allen et al. .................. 359/172 |
| 5,159,592 A | | 10/1992 | Perkins ....................... 370/85.7 |
| 5,220,678 A | * | 6/1993 | Feei ............................. 455/69 |
| 5,276,703 A | | 1/1994 | Budin et al. .................... 375/1 |
| 5,303,303 A | | 4/1994 | White .......................... 380/49 |
| 5,307,348 A | | 4/1994 | Buchholz et al. .......... 370/85.2 |
| 5,313,461 A | | 5/1994 | Ahl et al. ................... 370/94.2 |
| 5,436,902 A | | 7/1995 | McNamara et al. ....... 370/85.3 |
| 5,442,633 A | | 8/1995 | Perkins et al. ............. 370/94.1 |
| 5,475,681 A | | 12/1995 | White et al. ................... 370/60 |
| 5,519,691 A | | 5/1996 | Darcie et al. ................. 370/18 |
| 5,563,728 A | | 10/1996 | Allen et al. .................. 359/172 |
| 5,563,889 A | | 10/1996 | Gard et al. ................. 370/95.1 |
| 5,636,213 A | * | 6/1997 | Eastmond et al. .......... 370/278 |
| 5,648,969 A | | 7/1997 | Pasternak et al. ........... 370/349 |
| 5,657,317 A | | 8/1997 | Mahany et al. ............. 370/338 |
| 5,754,945 A | | 5/1998 | Lin et al. ................... 455/33.2 |
| 5,950,124 A | * | 9/1999 | Trompower et al. ..... 455/422.1 |
| 5,953,319 A | | 9/1999 | Dutta et al. .................. 370/238 |
| 2002/0036996 A1 | * | 3/2002 | Ozluturk et al. ............ 370/335 |

OTHER PUBLICATIONS

"Frequency Diviersity and Its Applications," F. Carassa, G. Tartara and E. Matricciani, International Journal of Satellite Communications, vol. 6, pp. 313–322, 1988.

"Up–Link Power Control of Satellite Earth–Stations As A Fade Countermeasure of 20/30 GHz Communications Systems," J. Hörle, International Journal of Satellite Communications, vol. 6, pp. 323–330, 1988.

"A Technique for Estimating the Throughput of Adaptive TDMA Fade Countermeasure Systems," S. Barton and S. Dinwiddy, International Journal of Satellite Communications, vol. 6, pp. 331–341, 1988.

"Fade Countermeasures At $K_a$ Band for Olympus," M. Willis and B. Evans, International Journal of Satellite Communications, vol. 6, pp. 301–311, 1988.

"A Unified Statistical Rain–Attenuation Model for Communication Link Fade Predictions and Optimal Stochastic Fade Control Design Using A Location–Dependent Rain–Statistics Database," Robert Manning, International Journal of Satellite Communication, vol. 8, pp. 11–30, 1990.

"Adaptive Modulation As A Fade Countermeasure. An Olympus Experiment," M. Filip and E. Vilar, International Journal of Satellite Communications, vol. 8, pp. 31–41, 1990.

*Radiowave Propagation in Satellite Communications*, Louis J. Ippolito, Jr., Van Nostrand Reinhold Company 1986, pp. 42–57 and 64–92.

*Digital Communications*, John G. Proakis, Mc Graw–Hill, Third Edition, 1990, pp. 278–285.

*CDMA Principles of Spread Spectrum Communication*, Andrew J. Viterbi, Addison–Wesley Wireless Communications Series, 1995, pp. 155–168.

Information on Giganet Ltd., the Microwave Fiber™ company.

Goldberg, Lee, "100Base–T4 Transceiver Simplifies Adapter, Repeater, and Switch Designs," Electronic Design, vol. 43, No. 6, Mar. 1995, USA.

* cited by examiner

METHOD AND APPARATUS FOR MAINTAINING A PREDEFINED TRANSMISSION QUALITY IN A WIRELESS NETWORK FOR A METROPOLITAN AREA

This application is a divisional of co-pending U.S. patent application Ser. No. 08/950,028, filed on Oct. 14, 1997, now abandoned, the contents of which are hereby incorporated by reference.

FIELD OF THE INVENTION

The invention relates to a wireless network for a metropolitan area. More particularly, the invention relates to a technique for maintaining a predefined transmission link quality in a wireless network for a metropolitan area.

BACKGROUND OF THE INVENTION

Computers utilized in modem office environments are typically coupled to a local area network (LAN). The LAN allow users of the computers to share common resources, such as a common printer included in the network, and allows the users to share information files, such as by including one or more file servers in the network. In addition, the users are typically able to communicate information with each other through electronic messaging. A commonly utilized type of LAN is Ethernet. Currently, a variety of products which support Ethernet are commercially available from a variety of sources.

Business organizations and their affiliates are often spread over several sites in a metropolitan or geographical area. For example, a business organization can have a headquarters, one or more branch offices, and various other facilities. For such business organizations, LANs located at the various sites will generally need to communicate information with each other. Wireless communication links for connecting local area networks are known. For example, U.S. Pat. No. 4,876,742, entitled "Apparatus and Method for Providing a Wireless Link Between Two Area Network Systems," and U.S. Pat. No. 5,436,902, entitled "Ethernet Extender," each disclose a wireless communication link for connecting LANs.

Availability of a wireless link is commonly expressed as the percentage of the time during which the bit error rate representing the performance of the link is lower than a given threshold level. Environmental precipitation causes a severe attenuation of the transmitted signal, especially for links operating in millimeter frequency bands. For example, to maintain an availability of 99.99% in the presence of environmental precipitation, the signal must be transmitted at a level as high as 24 dB/km higher than otherwise. Therefore, to ensure an acceptable data error rate under all expected conditions, data is typically communicated over a wireless communication link at a relatively high power and at a relatively low rate. The amount of data required to be communicated over the wireless link, however, can vary widely over time and can vary independently of environmental conditions. In addition, wireless links, especially those operated at high power levels, can cause interference with other wireless links operating in the same geographical area.

Therefore, what is needed is a technique for maintaining a predefined transmission quality while transmitting data over a wireless communication link in a metropolitan area network (MAN). What is further needed is a technique for transmitting data over a wireless communication link in a MAN at a rate sufficient to keep up with demand. What is still further needed is a technique for transmitting data over a wireless communication link in a MAN at a relatively low power. What is additionally needed is a technique for reducing interference between wireless communication links operating in the same geographical area.

SUMMARY OF THE INVENTION

The invention is a method and apparatus for maintaining a predefined transmission quality for transmitting data in a wireless metropolitan area network (MAN). Each of a plurality of local area networks (LANs) are coupled to a corresponding router. Each router is coupled to one or more transceivers for interconnecting the routers via wireless communication links, thus forming the MAN. Data for communication over the MAN is generated by a user or application at a source node in a source LAN and is communicated to a source router coupled to the source LAN. The data is used to modulate a carrier signal. A transceiver for the source router transmits the modulated signal along a path of one or more wireless communication links to a receiver of a destination router for the data. If the path includes more than one wireless link, one or more intermediate routers will receive and retransmit the modulated signal along the path. The destination router demodulates the signal and communicates the data to a destination node within a destination LAN.

Each router is coupled to one or more of the wireless links over which the router can selectively transmit data. In addition, each router stores a table representative of the topology of the entire MAN. Each router receives detected indicia representative of the transmission quality of wireless links in the MAN and detected indicia representative of network demand. Based upon the stored topology and detected indicia, each router determines a manner in which data is to be transmitted over a selected one of the corresponding wireless links.

In contrast to conventional wireless communications, the present invention maintains an overall availability of 99.99% or better by adapting the manner of transmission and the path of transmission to environmental and other conditions (by detecting transmission quality) and to demand placed upon the network (by detecting traffic loads) and by reliance upon the delay tolerant nature of packet switched communications. As a result, a MAN can be constructed according to the present invention that is highly efficient, in terms of cost, power and bandwidth utilization in order to achieve larger coverage and higher network density.

An example is provided of adapting the manner of transmission to detected transmission quality. The strength of the signal received over each wireless communication link is periodically monitored to determine whether the received signal strength is within a predefined range. If the signal strength falls outside the range, the power at which the modulated signal is transmitted is adjusted to return the signal strength to the range. In addition, the error rate for data received over each link is monitored.

If the received signal strength for a communication link remains below the predefined range despite the transmit power having been adjusted to a maximum allowable level, and if the error rate for data received over the wireless link approaches or exceeds a predefined limit, one or more techniques are employed to reduce the error rate while maintaining a sufficiently high network throughput. A first technique for reducing the error rate is to reduce a rate at which data is communicated along a path. A second technique for reducing the error rate is to alter a modulation level of transmitted signal along the path. A third technique for reducing the error rate is to alter an error correction coding scheme employed for data communicated along the path. A fourth technique is to utilize spectrum spreading for communicating the data along the path.

Each of these techniques for reducing the error rate for data communicated along a communication path is dynamically utilized, singly or in combination, for maintaining an error rate for the data below the predefined limit while maintaining sufficient data communication bandwidth to keep up with demand placed upon the MAN. By transmitting data over each link at a relatively low power, and by utilizing error correction coding and spectrum spreading, interference between links is kept to a minimum, allowing for a high network density in the MAN.

In addition, the amount of data communicated over each link is also monitored. The communication path is preferably selected according to an Open-Shortest-Path-First (OSPF) algorithm. If the shortest path does not have sufficient available bandwidth or results in an excessive error rate, a technique for reducing the error rate and for increasing the amount of data communicated is to select one or more alternate paths for communicating at least a portion of the data. Preferably, the alternate paths are selected to be the next shortest available paths.

DETAILED DESCRIPTION OF THE PREFERRED EMBODIMENT

Figure 1:
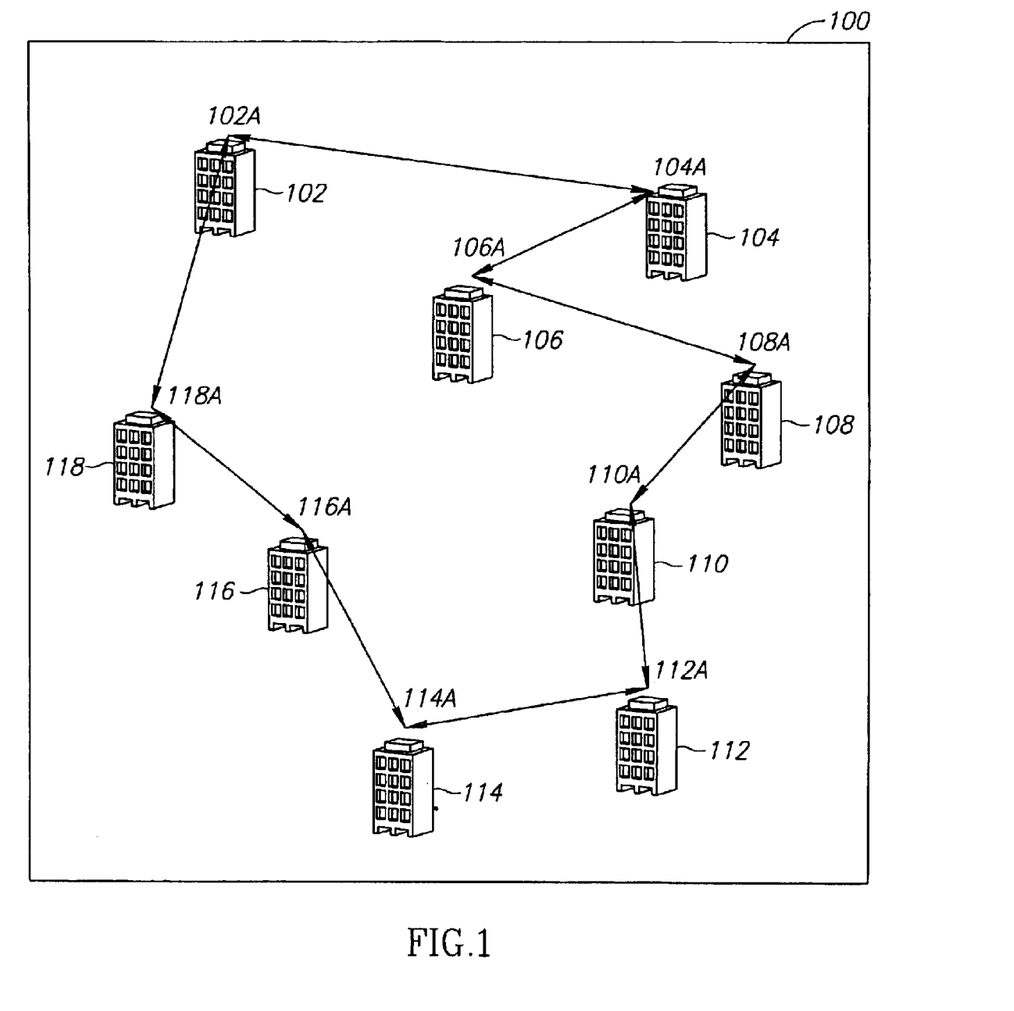
FIG. 1 illustrates a schematic representation of a metropolitan area in which the present invention forms a metropolitan area network (MAN).

FIG. 1 illustrates an example of a metropolitan area 100 in which the present invention forms a metropolitan area network (MAN). Located within a geographical or metropolitan area 100 are several sites 102–118. Each site 102–118 can be an office building, an industrial park, a manufacturing facility, a business headquarters, a branch office, a warehouse, or other facility. Each site 102–118 has one or more local area networks (LANs) located within the site 102–118. A router 300 (FIG. 3) according to the present invention is coupled to each LAN while one or more outer systems 400 (FIG. 4) according to the present invention are coupled to each router 300. The routers 300 are preferably located in wiring closets of the sites 102–118 in order to facilitate connection of the routers 300 to the LANs. The outer systems 400 each include a wireless transceiver for communicating data among the sites 102–118. Each outer system 400 is preferably located within a housing 102A–118A on rooftops of the sites 102–118.

Together, each router 300 and associated outer unit(s) 400 form a node of the MAN. The nodes are interconnected by wireless communication links. Multiple simultaneous communication links to a node can be achieved by providing multiple outer systems 400 for a site. Though nine sites 102–118 are illustrated in FIG. 1, it will be understood that the MAN can include more or less sites depending upon the geography of the metropolitan area 100 and upon the number of LANs to be interconnected. Thus, data originating from a node of a LAN located in one of the sites 102–118 can be communicated to other nodes in other ones of the sites 102–118 over the MAN. While the present invention is preferably configured for a metropolitan area, it will be appreciated that under certain circumstances, the network can be scaled to a larger or smaller region. For example, the present invention could be applied as between two or more metropolitan areas, or could be applied to smaller geographical regions, such a college or business campus. In addition, one or more of the sites can be configured to communicate data with a geo-synchronous satellite. In such case, the satellite can form a repeater for interconnecting remotely located MANs via satellite links. In such case, the satellite links can operate according to the present invention or according to known techniques.

Figure 2A:
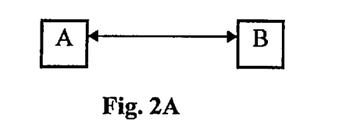
FIGS. 2A–F illustrate representative MAN topologies according to the present invention.
Figure 2B:
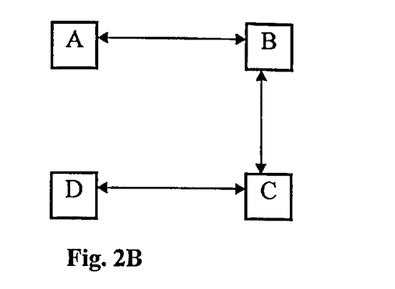
Figure 2C:
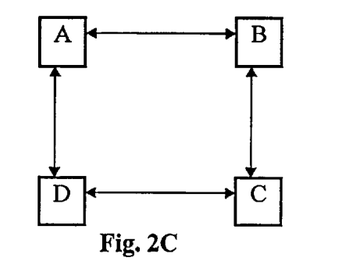
Figure 2D:
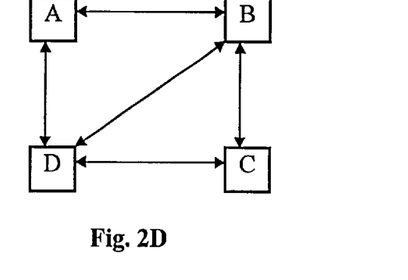
Figure 2E:
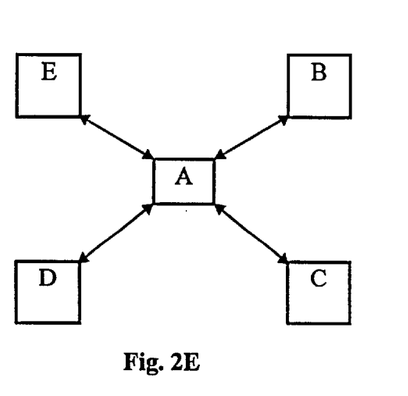
Figure 2F:
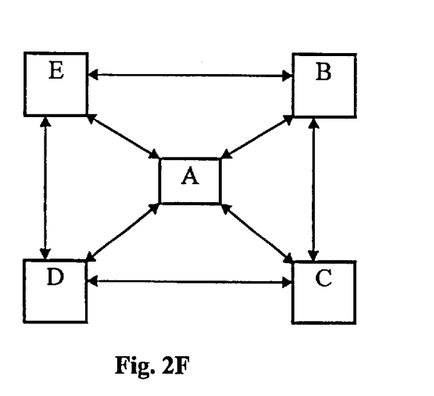

FIGS. 2A–F illustrate representative MAN topologies according to the present invention for interconnecting nodes A–E. FIG. 2A illustrates the simplest system with a point-to-point topology for interconnecting nodes A and B. FIG. 2B illustrates a linear topology for interconnecting nodes A–D. FIG. 2C illustrates a ring topology for interconnecting the nodes A–D. FIG. 2D illustrates a ring topology for interconnecting nodes A–D with a cross-link between nodes B and D. FIG. 2E illustrates a star topology for interconnecting the nodes A–E. FIG. 2F illustrates a star topology for interconnecting the nodes A–E with nodes B–E also interconnected in a ring topology. It will be apparent that additional topologies can be constructed according to the present invention for interconnecting any number of nodes based upon the topologies illustrated in FIGS. 2A–F and that other topologies besides those illustrated can be constructed according to the present invention.

In general, by providing a large number of links relative to the number of nodes, the capacity and reliability of the MAN is increased though its cost is also increased. For example, the topology illustrated in FIG. 2B requires a minimum number of links for connecting the nodes A–D, thus the topology of FIG. 2B can be constructed at a minimum cost. Note, however, that in FIG. 2B data communicated between nodes A and D must pass through nodes B and C. Thus, data communication will tend to concentrate in the link between nodes B and C, limiting the total network capacity. Further, there are no alternate communication paths that can be utilized to avoid a communication link that is degraded due to environmental precipitation or to avoid a link that is inoperative due to a component failure. In contrast, according to the topology illustrated in FIG. 2C, data can be communicated directly between nodes A and D. The additional link between nodes A and D provides an alternate path for the data, thus, expanding the total network capacity and reliability. Note, however, that in the MAN illustrated in FIG. 2C, data communicated between nodes B and D must pass through node A or node C. The cross-link illustrated in FIG. 2D provides an additional path for communicating data directly between the nodes B and D, further expanding the network capacity and reliability. If desired, yet another link can be added to FIG. 2D for communicating data directly between nodes A and C. In addition, redundant links can be provided between pairs of nodes of the MAN. By providing alternate data communication paths, data communicated in the network can be routed to avoid communication links that are temporarily degraded due to environmental conditions, temporarily congested due to large of amounts of network demand, or inoperative due to a component failure.

Note that the network topology can be configured to take advantage of foreknowledge about demand expected to be placed on the network. For example, assume it is known that an headquarters must communicate large amounts of data with each of several branch offices, but that the branch offices communicate less data with each other. A star topology, as illustrated in FIG. 2E, is well suited for such a MAN if the headquarters is located at node A and the branch offices located at nodes B–E. Note, however, that other network topologies, such as a ring topology (illustrated in FIGS. 2C or 2D), can be used for a MAN having a headquarters and branch office. In the star topology, data is communicated directly between each branch office and the headquarters, however, data communicated between branch offices must be indirectly communicated via the headquarters. If, however, each of the branch offices must also communicate large amounts of data with each other, additional links can be utilized, as shown in FIG. 2F. The network illustrated in FIG. 2F has a high capacity and reliability due to the large number of alternate communication paths. For example, data communicated between nodes B and D can pass through node E, or node A, or node C.

Accordingly, a network topology can be designed for interconnecting a given number of nodes with a number of links selected to provide enough alternate communication paths that the network has sufficient capacity and reliability while minimizing the associated costs. Note that additional links can be added to an existing MAN in order to keep up with increases in demand. In addition, nodes not connected to a LAN may function solely as repeating stations for increasing the number of alternate communication paths and for transmitting data over long distances.

Figure 3:
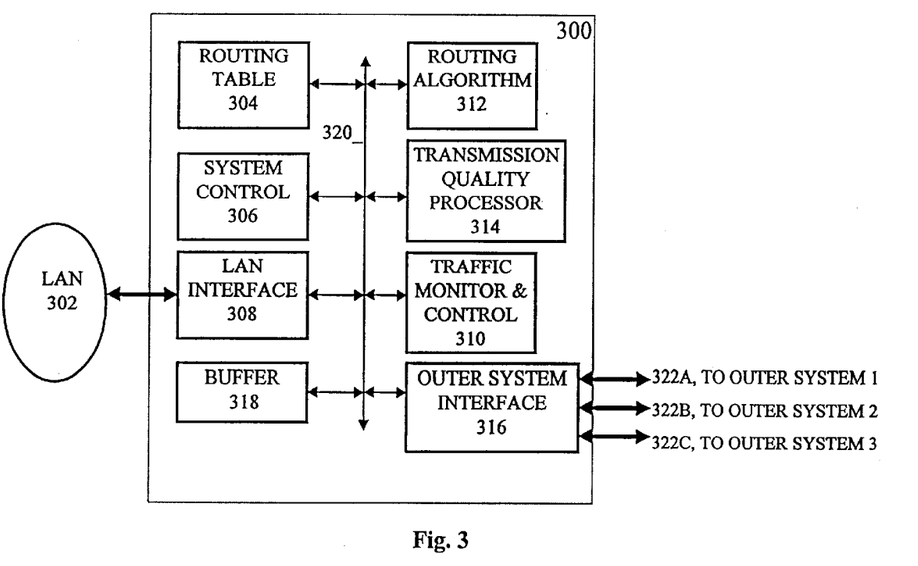
FIG. 3 illustrates a functional block diagram of a router according to the present invention coupled to a local area network (LAN).

FIG. 3 illustrates a functional block diagram of a router 300 according to the present invention coupled to a LAN 302. The router 300 includes several functional blocks 304–318 interconnected by an interconnection 320. Functions of the blocks 304–318 can be implemented by hardware circuits, in which case, the interconnection 320 represents a communication bus. Alternately, functions performed by the blocks 304–318 can be implemented by a processor operating according to a stored software program. The router 300 can be constructed as a dedicated stand-alone unit or the router 300 can be constructed by adding one or more circuit boards and software to an existing personal computer system.

The LAN 302 can operate according to any LAN protocol, though Ethernet is preferred due to its widespread utilization in existing sites, due in part because Ethernet LANs generally utilize telephone cabling that is pre-existing in many buildings. At the medium access control (MAC) level, Ethernet transmits data in packets according to a CSMA/CD protocol. Each Ethernet data packet generally includes a preamble, a destination node address, a source node address, a data field and a data check field.

The router 300 interconnects with the LAN 302 as though the router 300 is an additional node in the LAN 302. As such, the router 300 can send and receive data packets to and from the other nodes of the LAN 302 according the communication protocol of the LAN 302. The LAN 302 is interconnected to the router 300 through the LAN interface 308. The LAN interface 308 monitors data packets of the LAN 302; if the destination node address of a packet indicates that the packet is destined for a node contained in a LAN other than the LAN 302, the LAN interface 308 accepts the data packet. If the destination node address indicates that the data packet is destined for node within the LAN 302, the LAN interface 308 ignores the packet.

Data packets received from the LAN 302 are stored in the buffer 318 and conditioned for transmission over the MAN under control of the system control 306. This conditioning can include converting the format of the data into a format appropriate for transmission over the MAN. Such conversion may be necessary if the LAN 302 includes a LAN type other than Ethernet.

The routing table 304 stores data representative of the topology of the MAN, including a table which identifies which router of the MAN is coupled to each node of each LAN interconnected by the MAN. The router 300 reads the destination address contained in the packet received from the LAN 302 and utilizes the routing table 304 to determine which router (destination router) of the MAN is coupled to the LAN which includes the destination node. A header is then appended to the data packet which identifies the destination router that is to receive the packet. An additional data check field may also be added to each data packet, encapsulating the original data packet.

Figure 4:
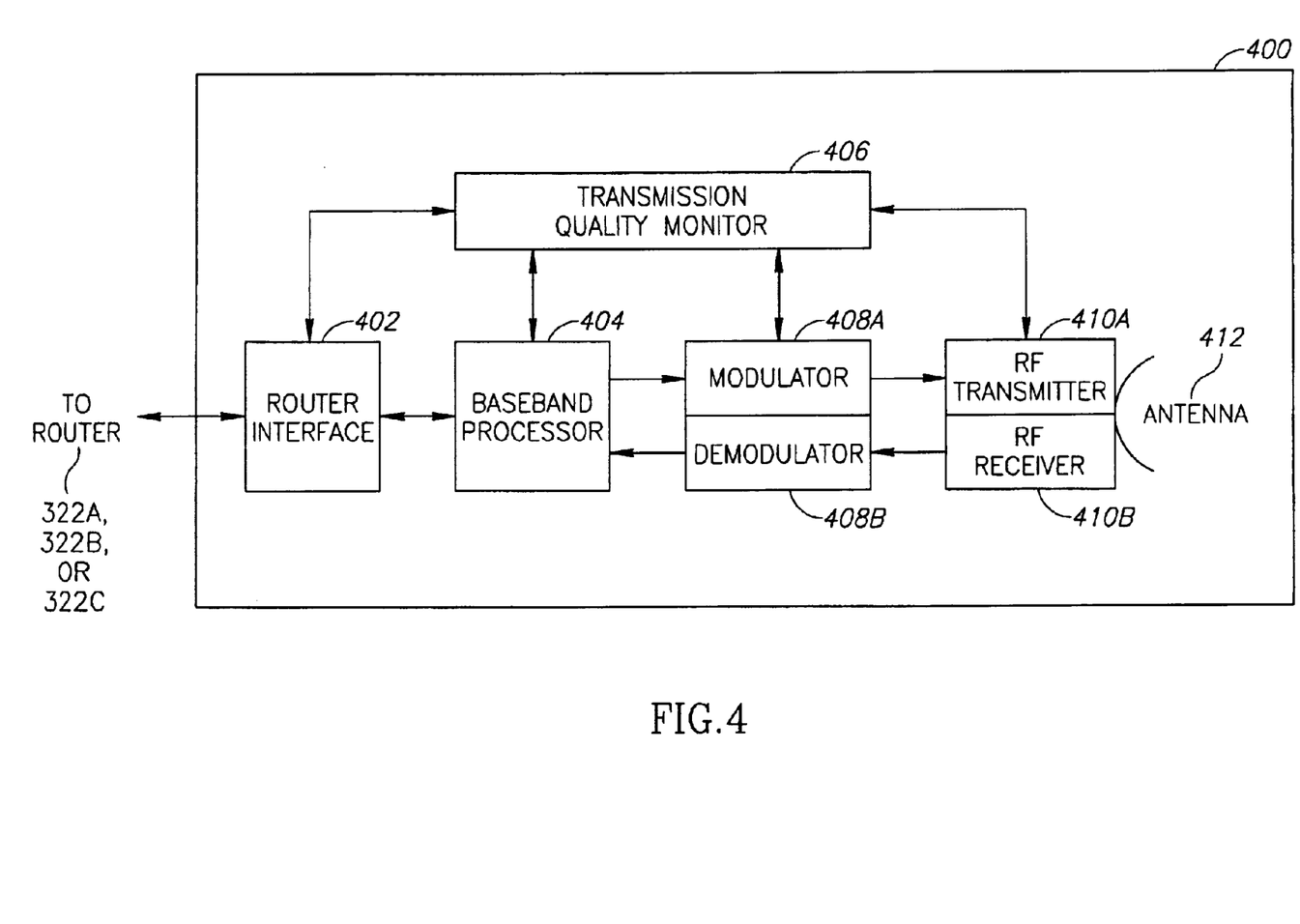
FIG. 4 illustrates a functional block diagram of an outer system according to the present invention including a radio frequency transceiver.

The packet is then communicated over an appropriate one of the links 322A–C to an appropriate outer system 400 (FIG. 4). If there is more that one outer system 400, the appropriate outer system 400 is selected according to the routing algorithm 312 and according to the routing table 304. The routing algorithm 312 preferably includes an Open-Shortest-Path-First algorithm (OSPF), although alternate paths can be selected, however, based upon detected transmission quality conditions and traffic levels in the MAN, as explained herein.

When the appropriate outer system 400 (FIG. 4) is available to transmit the data, the data is provided to the appropriate outer system 400 by the outer system interface 316 through the selected one of the links 322A–C. Though the outer system interface 316 is illustrated in FIG. 3 as being capable of interfacing the router 300 with up to three outer systems 400 through the links 322A–C, it will be apparent that more or fewer links 322A–C can be provided and, thus, more or fewer outer systems 400 can interface to a single router 300. Preferably, the links 322A–C operate according to Fast Ethernet standards, such as 100 BASE-TX, 100 BASE-FX or 100 BASE-T4, though other standards can be used, such as 10 BASE-T or 10 BASE-F. Because the router 300 is preferably located in a wiring closet and the one or more outer systems 400 are preferably located on a rooftop, the links 322A–C will generally extend from the wiring closet to the rooftop. Data packets for communication over the MAN; commands for communication between the router 300 and outer system 400 (node commands); and commands for communication between routers 300 (network commands) are all communicated over the links 322A–C at appropriate times.

FIG. 4 illustrates a functional block diagram of an outer system 400 according to the present invention. Data packets from the outer system interface 316 (FIG. 3) of the router 300 are received from a respective one of the links 322A–C by a router interface 402 and passed to a baseband processor 404. The baseband processor 404 selectively alters the bit rate of the data packets, selectively performs error correction encoding on the data packets and selectively performs spectrum spreading on the data packets, as necessary. Preferably, the baseband processor 404 can also selectively encrypt the data according to known encryption techniques for data security reasons. Data packets are then passed to the modulator section 408A of a modulator/demodulator 408. The modulator section 408A appropriately modulates the data onto a radio frequency carrier signal according to a selected modulation scheme, forming a modulated signal.

The modulated signal is then up-converted, amplified and transmitted over a wireless communication link of the MAN by a transmitter section 410A of a radio frequency (RF) transceiver 410. The transceiver 410 is coupled to an antenna 412 for this purpose. Preferably, a high-gain, directional antenna is used to achieve distances of up to 10 kilometers. This range is related to the preferred transmission frequency of 38 GHz, though a lower transmission frequency can be used which would result in a longer maximum transmission distance. Similarly, a transmission frequency higher than 38 GHz can also be used for a shorter range. The transceiver 410 is configured to adjust the power at which the modulated carrier signal is transmitted. The power is adjusted under control of the system control 306 (FIG. 3) of the router 300 by sending node commands to the outer system 400 over the appropriate one of the links 322A–C.

Data packets received from the wireless link are picked up by the antenna 412 and received by a receiver section 410B of the radio frequency transceiver 410. The received signal is appropriately demodulated by a demodulator section 408B of the modulator/demodulator block 408, reversing modulation performed on the data before the data was transmitted over the wireless link. The demodulated data is then passed to the baseband processor 404 which appropriately decodes the data, applies error correction to the data, and reverses any spectrum spreading or encryption applied to the data before it was transmitted over the link. The data packet is then communicated to the router 300 through the router interface 402.

A Transmission Quality Monitor 406 is coupled to the router interface 402, to the baseband processor 404, to the modulator/demodulator 408 and to the RF transceiver 410. The Transmission Quality Monitor 406 monitors the quality of the wireless transmission link from which the data is received in several ways. For example, the Transmission Quality Monitor 406 calculates the bit error rate (BER) based upon data errors reported to the Transmission Quality Monitor 406 by the baseband processor 404. In addition, the Transmission Quality Monitor 406 can monitor the received signal strength (RSL) from the receiver 410B and the signal-to-noise ratio (SNR) of the signal received from the demodulator 408B. Other performance parameters, such as cluster variance, eye opening, uncorrected error count, and so forth, can also be monitored.

The performance parameters, such as BER, RSL, and SNR, are considered herein as forming a performance indicator of the wireless link in the receiving direction. The Transmission Quality Monitor 406 periodically reports the monitored performance indicator to the router 300. The Transmission Quality Monitor 406 also sends the measured performance indicator to its counterpart in the other node of the wireless link so that both nodes have a complete knowledge of the performance parameters in both directions of communication. The Transmission Quality Monitor 406 then performs an appropriate control procedure discussed herein in order to maintain the required transmission performance. For example, referring to the wireless link connecting nodes B and C in FIG. 2C, the Transmission Quality Monitor 406 of node B periodically reports its monitor performance to the Transmission Quality Monitor 406 of node C and vice versa. The Transmission Quality Monitors 406 of both nodes keep a history of the performance indicators for further performance and fault analysis by itself or by the Transmission Quality Processor 314. As the values of the performance indicators are periodically exchanged, there is a built-in form of repetitive transmission and diversity transmission. As used herein, repetitive transmission refers to transmitting data redundantly, whereas, diversity transmission refers to the sending of data according to multiple different formats. As a result, the present invention quickly detects changes in the performance indicator and appropriately responds to such changes. Accordingly, any abrupt change in newly received data is readily filtered out.

Each Transmission Quality Processor 314 can be coupled to more than one outer system 400, and thus, each router 300 can receive transmissions of performance indicators from these more than one wireless link. In addition, each Transmission Quality Processor 314 can receive the performance indicators of other links in the MAN via network commands. Accordingly, each Transmission Quality Processor 306 can analyze the global (throughout the entire MAN) transmission quality of the wireless links in the MAN and can determine an appropriate response based upon current quality conditions for each of the wireless links coupled to the router 300, past quality conditions for each of the wireless links coupled to the router 300 and based upon current or past quality conditions for other wireless links reported by one or more other routers of the MAN.

Data packets communicated to the router 300 from the outer system 400 are received by the outer system interface 316 of the router 300. By examining the header appended to the packet, the outer system interface 316 determines whether the router 300 is an intermediate router in the communication path for the packet and whether the LAN 302 is the final destination for the data packet. If the LAN 302 is the final destination for the data packet, the packet is conditioned for communication to the LAN 302. This conditioning includes the removal of the additional header that was appended to the data packet before transmission. The data packet is stored in the buffer 318 until the LAN 302 is available to receive the packet.

If the LAN 302 is not the final destination for the packet, the router 300 is an intermediate router in the communication path for the data packet. In such case, the outer system interface 316 stores the packet in the buffer 318. When more than one outer system 400 is coupled to the router 300, the routing algorithm 312 then determines to which of these outer systems 400 to communicate the packet for transmission over the MAN. This determination is based upon an OSPF algorithm using the routing table 304 and routing algorithm 312 and upon detected transmission quality conditions and traffic levels in the MAN. When the appropriate outer system 400 is available to retransmit the packet to the next router in the communication path for the packet, the packet is retrieved from the buffer 318 by the outer system interface 316 and is provided to the appropriate outer system 400 which retransmits the data over the MAN.

The amount of data traffic through the router 300 (data transmitted and received by the router 300) is monitored by the traffic monitor and control 310 based upon the amount of data stored and removed from the buffer 318 and the frequency at which the data is stored and removed from the buffer 318. The amount of data traffic is used by the routing algorithm 312 for appropriately routing data in the MAN.

The amount of data is the network demand on the node. The system control 306 can periodically communicate performance indicators and detected network demand to the other routers of the MAN via network command packets. Although the Transmission Quality Processor 314 and system control 306 are shown as parts of the router 300, they can also be implemented as software functions located in a workstation or in a network controller connected to the network. Preferably, overhead associated with communicating the network command packets is less than two percent of the total data throughput capacity of the MAN.

For a normal operation, the BER of wireless links throughout the MAN is preferably maintained below an acceptable threshold. Link availability is defined as the percentage of the time of normal operation. For example, a link availability of 99.99% and a required threshold BER of $10^{-9}$ imply that 99.99% of the time, the BER of wireless links throughout the MAN is maintained below $10^{-9}$. High link availability and low BER threshold are preferred in the MAN. In a clear-sky condition, the signal attenuation is mainly due to a free-space propagation loss. The power of the transmitted signal should be high enough to maintain the BER below an acceptable threshold. However, in an abnormal condition, additional losses (rain-fade) can be introduced by atmospheric changes such as rain, fog, ducting, and so forth. Therefore, in order to maintain a normal operation in an abnormal condition, the transmitter must operate with a transmitted power above that required in a clear-sky condition. The difference between the power of the transmitted signal and that required in a clear-sky condition is known as the fade margin. Higher required link availability or a longer range requires a larger fade margin. Since the signal attenuation due to rain over high radio frequency bands, such as 38 GHz, is very high, a traditional wireless link design based on the fade margin requires an excessively high transmitted power or yields an impracticably short range to achieve the required high availability. The present invention presents a novel method of and apparatus for achieving both long range and high link availability with low transmitted power by using a combination of adaptive modulation, low-rate error correction coding and data rate reduction techniques for rain-fade countermeasure. Furthermore, by including an intelligent routing strategy where data is communicated between nodes via one or more appropriately selected paths (link diversity), the present invention increases the MAN capacity and reliability.

By using a combination of adaptive power control, data rate reduction, modulation level reduction, and low-rate error correction coding, a longer range can be achieved at low transmitted power, as described herein. Consider, as an example, a programmable M-ary Quadrature Amplitude Modulation (QAM) scheme being used in the modulator/demodulator 408 in FIG. 3. For example, assume16QAM is used to carry 100 Mb/s full-duplex Fast Ethernet over a wireless link in the MAN. In order to achieve a BER of better than $10^{-4}$, the RSL must be kept higher than a predefined threshold level, designated herein as RSL16. Furthermore, in order to avoid performance degradation due to nonlinear AM-to-AM and AM-to-PM distortions, the transmitted power is preferably maintained at 6 dB or more below the 1 dB-compression point of the power amplifier for 16QAM. The 1 dB-compression point refers to an input signal applied to the power amplifier which results in an output signal that is 1 dB lower than would be expected if the power amplifier had linear gain.

In a given time interval during rain fades, if the monitored BER and RSL of a particular link are approaching their predefined threshold levels, (e.g., $10^{-4}$ and RSL16), appropriate countermeasures are invoked in order to improve link performance and maintain the required link availability. The countermeasures can be one or more of the following: momentarily reducing the link transmission rate, reducing the modulation level and/or introducing a low-rate error correction coding. For example, if in response to rain fade, the link operates at a transmission rate that is reduced to 50 Mb/s, and with a modulation level that is reduced to 4QAM, its RSL threshold for $10^{-4}$, designated herein as RSL4, is 8 dB lower than the threshold RSL16. In addition, since 4QAM can tolerate more nonlinear AM-to-AM and AM-to-PM distortions, the transmitted power can be increased up to 2 dB below the 1 dB-compression point of the power amplifier. In other words, with the same power amplifier, the useable transmitted power for 4QAM is 4 dB higher than that in the case of 16QAM. Therefore, by switching from 100 Mb/s, 16QAM to 50 Mb/s, 4QAM, the net gain in RSL is 12 dB. Accordingly, the link can maintain the required availability despite an increase of 12 dB in signal attenuation due to rain fade.

By further reducing the transmission rate to 6.25 Mb/s and using 4QAM, the gain in rate reduction is 9 dB as compared to the case of 50 Mb/s and 4QAM. Furthermore, for the same occupied bandwidth, a low-rate error correction coding scheme such as the Super-Orthogonal Convolutional Code can be used to obtain an additional coding gain of 5 dB. In addition, spectrum spreading can be used in conjunction with data rate reduction to reduce the interference between communication links. In other words, operation at 6.25 Mb/s and 4QAM provides an overall gain of 14 dB as compared to 50 Mb/s, 4QAM, or of 26 dB as compared to 100 Mb/s, 16QAM.

The obtained gain is used to compensate the increase in signal attenuation due to rain over a relatively short duration of time. For example, consider an objective availability of 99.99% for a wireless link required to provide 100 Mb/s full-duplex fast Ethernet. According to conventional design techniques, in order to maintain the required availability, such a link would have a link power budget that includes a large fade margin for fixed operation at 100 Mb/s. In contrast, according to the present invention, a link availability of 99.9% can be achieved while providing a comparatively longer range for operation at 100 Mb/s, 16QAM. Further, a higher link availability of 99.99% can be provided by the present invention for operation at lower data rate and lower modulation level.

The packet-switched nature of Ethernet is advantageously utilized by the present invention in the MAN. For example, packet-switched communications tend to be bursty in that network demand can be characterized by periods of relatively high demand and periods of relatively low demand. In addition, packet-switched communications also tend to be somewhat delay tolerant in that packets can be temporarily stored before they are forwarded (store and forward). Accordingly, an overall availability of 99.99% can be achieved through the present invention in a MAN that provides the maximum transmission rate (e.g. 100 Mb/s) 99.9% of the time and a reduced transmission rate (e.g. 50 Mb/s or 6.25 Mb/s) the remaining 0.09% of the time to maintain acceptable performance during heavy rain fades. If during such heavy rain fades, the actual traffic flow over that link is below the reduced transmission rate, no further action is required. If the demand on that link, however, exceeds the reduced transmission rate, the router 300 re-directs the excessive traffic to other, alternate, links of the MAN. Data packets are preferably transmitted according to an Open- Shortest-Path-First (OSPF) algorithm. Therefore, if the shortest communication path between a source router and destination router has sufficient available bandwidth, all the data will be transmitted along this shortest path. If the shortest path momentarily does not have sufficient transmission capacity to accommodate the current traffic flow due to the reduced data rate, however, all or selected data packets can be routed along a longer, but less busy, alternate communication path. Preferably, alternate communication paths are selected to be the next shortest paths.

Note that in a conventional wireless communication link, if, in a given area, a fade margin of 9 dB/km is required to maintain an availability of 99.9%, then it must be increased to 24 dB/km to maintain an availability of 99.99%. Therefore, in contrast to conventional wireless communications, the present invention maintains an overall availability of 99.99% or better by adapting the manner of transmission and the path of transmission to the environmental conditions (by detecting transmission quality) and to the demand placed upon the network (by detecting traffic loads) and by reliance upon the delay tolerant nature of packet switched communications. As a result, a MAN can be constructed according to the present invention that is much more efficient, in terms of cost, power and bandwidth utilization, than in the prior art, to cover a substantially longer distance. For example, to achieve an objective link availability of 99.99% with a transmit power of 50 mW in a given area, the conventional link budget design based on a fixed fade margin for 100 Mb/s, 16QAM can provide an expected range of 3.5 km. For the same transmitted power and environmental conditions, the present invention having adaptive rain-fade countermeasure techniques can provide an expected range of 5 km or 7 km with a reduced rate during short periods of heavy rain fades of 50 Mb/s or 6.25 Mb/s, respectively.

Figure 5:
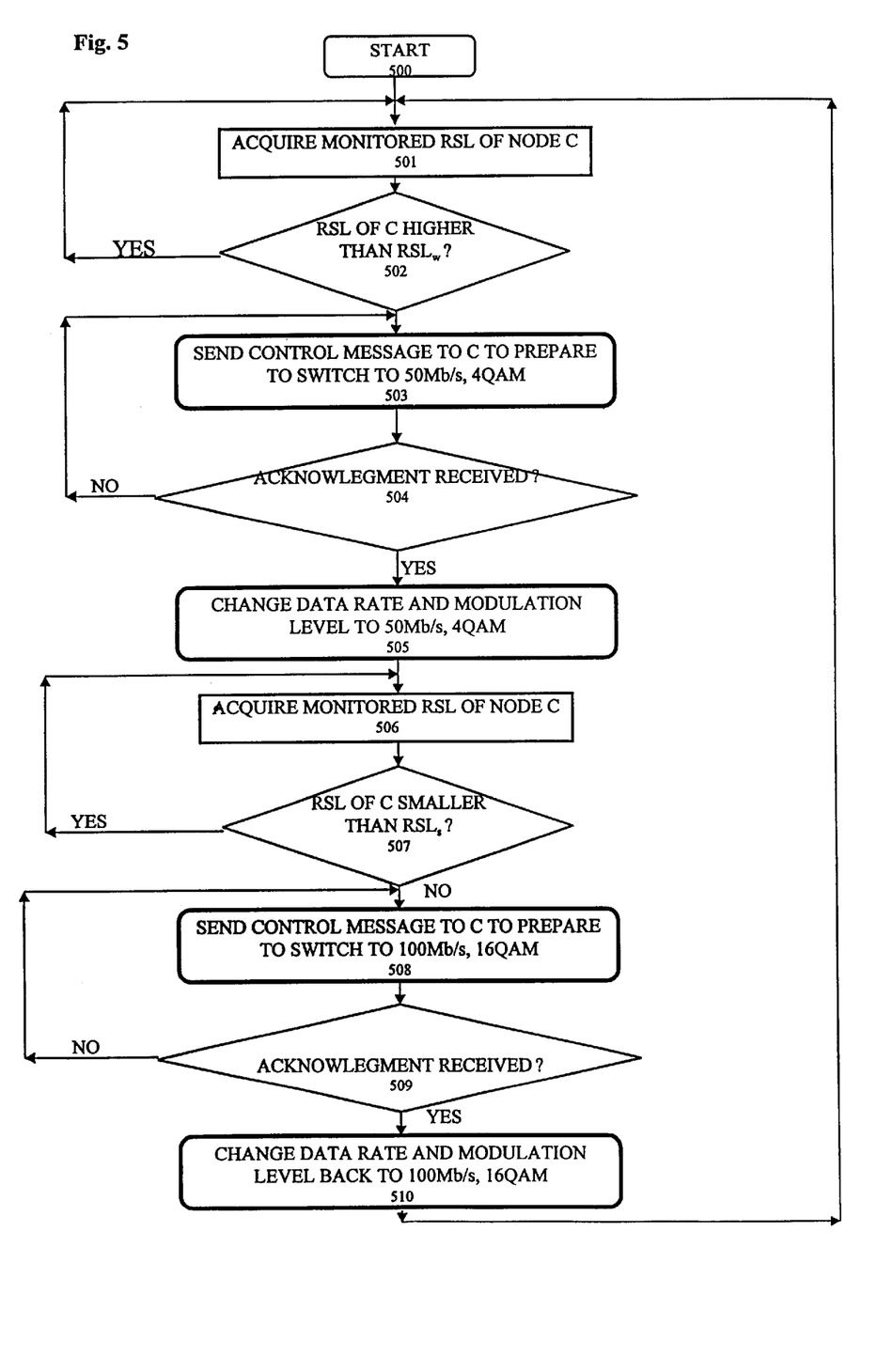
FIG. 5 illustrates a flow diagram according to the present invention for maintaining transmission quality in a wireless link.
Figure 6:
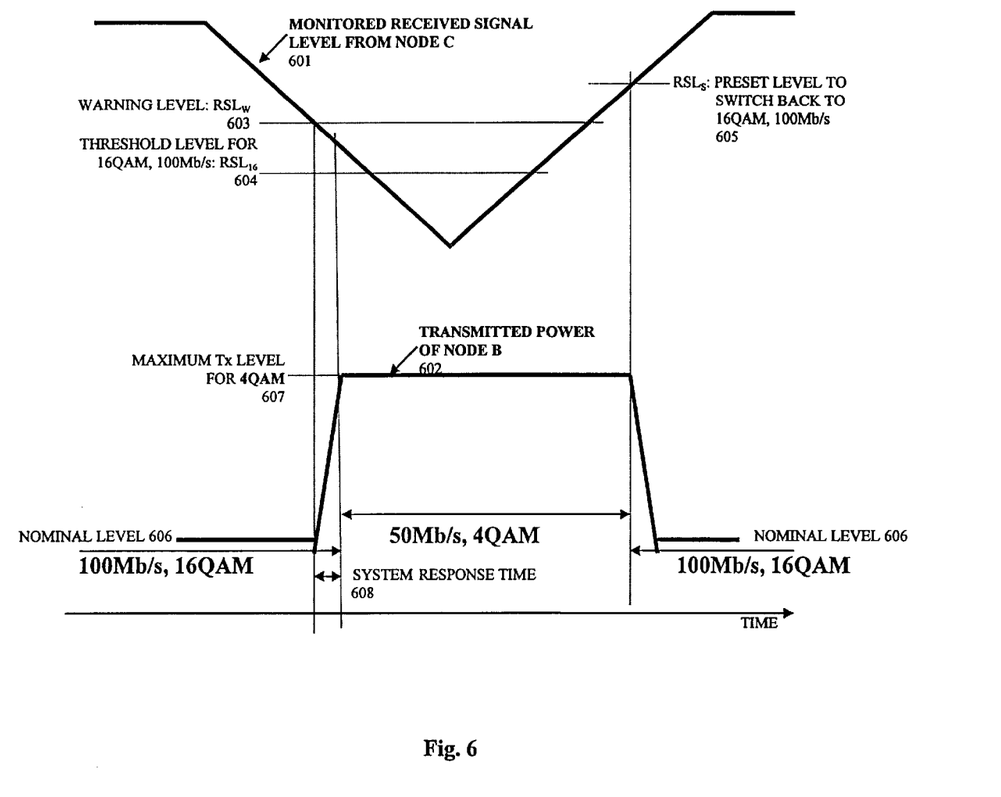
FIG. 6 illustrates the timing relationship between the monitored RSL and transmitted power of the operation corresponding to the flow diagram of FIG. 5 during a period of heavy rain fade.

As an illustrative example of the implementation of a monitoring and control procedure according to the present invention, FIGS. 5 and 6 illustrate a flow diagram and timing relationships between monitored RSL and transmitted power during a period of heavy rain fade, respectively. Consider, for example, the wireless link between nodes B and C in FIG. 2C. The nodes B and C periodically exchange their monitored performance indicators. The flow diagram starts in the block 500 and followed by the node B, though it will be apparent that the Node C follows a corresponding flow diagram. Node B keeps track of its own transmitted power and the monitored RSL and BER of Node C in block 501 (FIG. 5), and vice versa. In a normal condition, Node B sets its transmitted power 602 (FIG. 6) to a nominal level 606 for a data rate of 100 Mb/s and 16QAM. This nominal level 606 is selected to be low enough to avoid nonlinear effects on the link performance of the transmit power amplifier of Node B as well as of the receiver of Node C. For 16QAM, this nominal level 606 is preferably 6 dB or more below the 1 dB-compression point of the power amplifier. The nominal level 606 is also selected to ensure that the transmission link is of sufficient quality such that the bit error rate (BER) will generally be below the maximum predetermined level, while avoiding transmitting the signal at an excessive power which might interfere with other wireless links. A similar arrangement is applied to Node C.

When rain fade occurs over the link between the nodes B and C, the RSL of both Node B and Node C tends to be reduced. As the RSL of Node C 601 (FIG. 6) is approaching the threshold value $RSL_{16}$ 604, the monitored BER also tends to increase. In the block 502 (FIG. 5), Node B continuously compares the monitored RSL of Node C 601 to a preset warning level $RSL_w$ 603 (FIG. 6) where $RSL_w$ is selected to be higher than $RSL_{16}$ 604. When the monitored RSL of Node C 601 is below the preset warning level $RSL_w$ 603, Node B sends a control message to Node C instructing Node C to prepare to switch to lower data rate and to a lower modulation level (e.g., 50 Mb/s, 4QAM) in the block 503 (FIG. 5). The router of Node B is also conditioned to prepare for the re-direction of excessive traffic, if necessary. Upon reception of the control message from B, Node C prepares for the change and sends an acknowledgment message to B. Node B receives the acknowledgment message from Node C, as verified in the block 504. Then, Node B applies the reduced data rate and lower modulation level on its transmitted signal in a manner that is coordinated with the Node C in the block 505. Node B also increases its transmitted power 602 (FIG. 6) to its maximum level for 4QAM 607. Selection of the warning level $RSL_w$ 603 (FIG. 6) takes into consideration the delay time 608 for the Nodes B and C to process and exchange commands so that the switching to the operation at the low data rate and low modulation level takes place before the RSL drops below $RSL_{16}$. Since statistical measures indicate that the maximum rain-fade rate is about 0.5 dB/s, the warning level $RSL_w$ is normally relatively close to $RSL_{16}$.

Assuming that the rain fade is transitory, switching from low data rate to high data rate occurs. Node B continuously receives the monitored RSL and BER from Node C in the block 506 (FIG. 5). When the rain fade is reduced, the RSL is increased. In the block 507 (FIG. 5), Node B continuously compares the monitored RSL of Node C to a preset level $RSL_s$ 605 (FIG. 6). As the RSL of Node C 601 (FIG. 6) becomes higher than the preset level $RSL_s$ 605, Node B sends to Node C a message requesting a change to higher data rate and an increased modulation level in the block 508 (FIG. 5). In response to this received message, Node C conditions itself to prepare for the higher data rate and higher modulation level, and sends an acknowledgment message to Node B. Node B receives the acknowledgment from Node C, as verified in the block 509 (FIG. 5). Node B then applies the higher data rate and higher modulation level on its transmitted signal in a coordinated manner with the Node C in the block 510. Node B also reduces its transmitted power back to the normal level, and informs its router of this condition. The preset level $RSL_s$ 605 (FIG. 6) is selected to be higher than $RSL_w$ 603, introducing hysteresis to prevent changing the data format unnecessarily often.

The above procedure is executed by the Transmission Quality Processor 314 under the supervision of the system control 306 in FIG. 3. In the above descriptions, examples with two operational sets: 100 Mb/s with 16QAM; and 50 Mb/s with 4QAM, are used to illustrate the above technique. However, it will be apparent that the above technique is readily applicable to other low data rates and to more than two operation sets.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the device of the present invention could be implemented in several different ways and the apparatus disclosed above is only illustrative of the preferred embodiment of the invention and is in no way a limitation.

What is claimed is:

1. A metropolitan area network for communicating data among a plurality of local area networks, the metropolitan area network comprising:
   a. a plurality of transceivers, wherein pairs of the transceivers communicate data with each other over a corresponding wireless link, each transceiver including a transmitter for transmitting data over the corresponding wireless link and each transceiver including a receiver data from the corresponding wireless link;
   b. a plurality of transmission quality monitors, each coupled to a corresponding one of the plurality of transceivers for monitoring a transmission quality for the corresponding wireless link; and
   c. a plurality of routers, wherein each router is coupled to a corresponding one of the plurality of transceivers and to a corresponding one of the plurality of local area networks, for routing the data received from he corresponding wireless link to the local area network when the local area network is a destination for the data and for routing the data to another one of the plurality of routers when the local area network is not a destination for the data and wherein each router selectively alters a format for transmitting the data to the corresponding transceiver based upon the rate at which errors occur in the data.

2. The metropolitan area network according to claim 1 wherein at least one of the plurality of transmission quality monitors the transmission quality for the corresponding wireless link by monitoring a rate at which errors occur in the data received from the corresponding wireless link.

3. The metropolitan area network according to claims 1 wherein a power level for transmitting data is controlled in a feedback loop.

4. The metropolitan area network according to claims 1 wherein the format for transmitting the data is selectively altered by transmitting a command over the corresponding wireless link.

5. The metropolitan area network according to claim 1 wherein the data is communicated among the plurality local area networks over a communication path comprising one or more wireless links.

6. The metropolitan area network according to claim 5 wherein each of the plurality of routers selectively alters the format for transmitting the data by selectively activating one or more techniques from a group consisting of: altering a bit rate for transmitting the data; altering a modulation scheme for transmitting the data; altering error correction coding for transmitting the data; altering spectrum spreading for transmitting the data; altering a power level for transmitting the data; and altering the communication path for transmitting the data.

* * * * *

UNITED STATES PATENT AND TRADEMARK OFFICE
CERTIFICATE OF CORRECTION

PATENT NO. : 6,714,551 B1  
APPLICATION NO. : 09/620301  
DATED : March 30, 2004  
INVENTOR(S) : Tho Le-Ngoc It is certified that error appears in the above-identified patent and that said Letters Patent is hereby corrected as shown below:

Claim 1, column 13 lines 9-10, delete "receiver data" and insert --receiver for receiving data--;
Claim 1, column 13 line 18, delete "he" and insert --the--;
Claim 2, column 13 line 28 - column 14 line 1, delete "quality monitors the transmission quality" and insert --quality monitors monitor the transmission quality--;
Claim 3, column 14 line 4, delete "claims" and insert --claim--;
Claim 4, column 14 line 7, delete "claims" and insert --claim--.

Signed and Sealed this

Twenty-second Day of July, 2008

JON W. DUDAS  
*Director of the United States Patent and Trademark Office*